United States Patent [19]
Bistervels et al.

[11] Patent Number: 5,506,021
[45] Date of Patent: Apr. 9, 1996

[54] SUBSTRATE PLATE FOR THE MANUFACTURE OF A MOLD FOR THE PRODUCTION OF OPTICAL REGISTRATION CARRIERS AND A METHOD FOR MANUFACTURING SAME

[75] Inventors: Franciscus M. C. M. Bistervels, Geldrop; Johanna H. M. van Ham, Valkenswaard, both of Netherlands

[73] Assignee: Odme International B.V., Netherlands

[21] Appl. No.: 188,327

[22] Filed: Jan. 24, 1994

[30] Foreign Application Priority Data

Jan. 22, 1993 [NL]   Netherlands ............................ 9300126

[51] Int. Cl.⁶ ...................................................... G11B 7/24
[52] U.S. Cl. .................... 428/64.1; 346/135.1; 428/65.1; 428/66.7; 428/473.5; 428/913
[58] Field of Search ................................. 428/64, 65, 66, 428/473.5, 913; 346/135.1

[56] References Cited

U.S. PATENT DOCUMENTS

| | | | |
|---|---|---|---|
| 4,563,824 | 1/1986 | Baun | 33/568 |
| 4,625,215 | 11/1986 | Muchnik | 428/65 |
| 4,690,370 | 9/1987 | Skinner | 249/114 R |
| 5,283,159 | 2/1994 | Norton | 430/275 |
| 5,304,455 | 4/1994 | van Liempd | 430/270 |

FOREIGN PATENT DOCUMENTS 071955  4/1988  Japan ........................................ 428/65

OTHER PUBLICATIONS

Horigome, et al. "Novel Stamper Process for Optical Disk", Proceedins of the SPIE.

Patent Abstract of Japan, vol. 8, No. 234 Oct. 26, 1984.

*Primary Examiner*—Nasser Ahmad
*Attorney, Agent, or Firm*—Cushman Darby & Cushman

[57] ABSTRACT

A substrate plate of plastic material instead of glass for the manufacture of a metal mold for the production of optical registration carriers of plastic material. Polyether imide is a suitable plastic material for forming the substrate plate. A suitable molding process is injection molding, wherein a highly polished mold is used.

16 Claims, 1 Drawing Sheet

SUBSTRATE PLATE FOR THE MANUFACTURE OF A MOLD FOR THE PRODUCTION OF OPTICAL REGISTRATION CARRIERS AND A METHOD FOR MANUFACTURING SAME

FIELD OF THE INVENTION

The invention relates to a substrate plate for use in the manufacture of a metal mold for the production of disc-shaped optical registration carriers of plastic material and to a method for manufacturing same.

BACKGROUND OF THE PRESENT INVENTION

For the manufacture of a metal mold or father plate, also called mastering and electroforming, for the production of disc-shaped optical registration carriers of plastic material, such as CD's or LD's (video discs, use is made of glass substrate plates or master plates. The demands made of the surface of the glass substrate plate are very strict, so that finishing operations, such as grinding and/or polishing and brushing (with a view to removing a blue haze), are necessary. The contaminations produced in the grinding and/or polishing operations are difficult to remove. Furthermore demands are made of the eccentricity of the substrate plates. In this connection it is known to bond a metal plug centrally on the substrate plate or to make a central hole in the substrate plate or to use an accurate positioning unit, as in the applicant's Automatic Numbering System (AMS) system. All in all glass substrate plates have the disadvantage of requiring laborious, time-consuming and cost-increasing operations.

SUMMARY OF THE PRESENT INVENTION

The object of the invention is to overcome these drawbacks and in order to accomplish that objective it provides a substrate plate of the kind mentioned in the introduction, which is characterized in that it is made of plastic material.

It is obvious thereby that the plastic substrate plate has a high surface accuracy, just like the glass plate, and is chemically and thermally inert with respect to the method for manufacturing metal molds by using chemicals and heat treatment, and that the plastic material which is used for the substrate plates must be moldable.

Furthermore the surface accuracy of the substrate plate is determined by the molding process and the molding means used thereby, so that not every substrate plate needs to be worked individually, as is the case with the known glass substrate plates. Furthermore the substrate plate being proposed may be given a centering configuration in the molding process, which configuration is determined by the molding means, so that also in this case separate processing is not required. Furthermore the molding process and the molding means make it possible to vary the diameter and the thickness of the proposed substrate plate. Finally the plastic material of the substrate plate may be selected to absorb laser writing light and/or transmits laser measuring light from an order meter. In the latter case the proposed substrate plate must be of an optical quality.

A suitable material is polyether imide, which is commercially available from GE Plastics under the registered tradename Ultem, in particular Ultem 1000 because of its reduced brittleness, a material which up to now has been used for products intended for use at elevated temperatures, such as microwave oven dishes, sterilization dishes and car light housings.

The invention also provides a method for manufacturing the proposed substrate plate, which is characterized in that an injection molding process is used.

The mold thereby determines the surface accuracy of the substrate plate, so that said substrate plate is preferably highly polished, while the centering configuration may be determined by said mold.

An operation that may be necessary when using the proposed method is to remove the static charge from the substrate plate following the injection molding, which is not necessary when glass substrate plates are being used.

BRIEF DESCRIPTION OF THE DRAWINGS

The invention will be explained in more detail hereafter with reference to the drawings, in which.

DETAILED DESCRIPTION OF THE DRAWINGS

In the following description we will proceed as yet from a known photoresist method for manufacturing metal molds for the production of disc-shaped registration carriers of plastic material, which is also known, and which may involve the manufacture of father plates and/or son plates or stamper plates.

Figure 1:
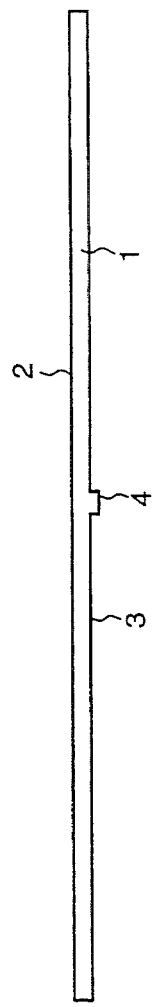
FIG. 1 is a schematic sectional view of a substrate plate according to the invention.

FIG. 1 shows a schematic sectional view of an embodiment of the proposed plastic substrate plate indicated at 1. The upper side of the substrate plate 1 is indicated at 2, whilst the bottom side of the substrate plate 1 is indicated at 3. Reference numeral 4 indicates a central cylindrical projection to be used for centering purposes. In this case positive centering is concerned. It is also possible to use negative centering or a central hole, or no centering at all. In the last-mentioned case an accurate positioning mechanism must be provided, as in the applicant's AMS system. The use of the centering boss 4 is known to those skilled in the art for that matter. What is new is the fact that the centering boss 4 may be integrally formed with the substrate plate 1. In the aforesaid AMS system the diameter of the substrate plate 1 is thus some 16 cm, whilst the thickness is substantially 2 mm. It is obvious that the upper side 2 is the side which is coated with a photoresist when using the photoresist method. In order to obtain a satisfactory bonding of the photoresist a first coating may be applied to the substrate plate 1. The photoresist layer to be applied is also called the registration layer, because the desired information is registered therein by means of laser writing light.

As already said before the substrate plate 1 is made of moldable plastic material by means of a molding process, in a centering configuration, if desired, inclusive of a projection 4 or a corresponding recess (not shown). Intrinsically to the purpose for which it is to be used, the plastic material used for forming the substrate plate 1 needs to be chemically and thermally inert with respect to the mastering process being used.

In accordance with a possible and known photoresist mastering process a photoresist is applied to the upper side 2 of the substrate plate 1 at ambient temperature, whereby the solvents used are 90% methyl isobutyl ketone (MIBK)

and 10% n-butyl acetate/xylene/2-ethoxy ethyl acetate. Then the substrate plate 1 with the applied photoresist are exposed to hot air, the conditions varying from 30 minutes at 80° to 6 minutes at 160°. Then the registration information pattern is written into the heat-treated photoresist in a laser beam recorder at ambient temperature, whereby no chemicals are used. Subsequently, the photoresist layer is developed into a patterned photoresist layer in an NaOH solution. A metal film is applied to the developed photoresist by means of a vapour deposition process, sputtering or a wet chemical process. Subsequently a metal film is deposited at a pH of about 4 and a temperature of 50°–60° C. in 90 minutes, using a solvent and chemicals, which metal film will be the metal mold after being removed from the substrate plate and being cleaned in order to remove any residual photoresist.

Instead of the photoresist mastering process it is also possible to use ablative mastering processes, which are based on the evaporation of nitrocellulose. In that case a colorant is added to the nitrocellulose, which absorbs the laser writing light and heats the nitrocellulose, whereby the colorant and the wave length of the laser writing light are attuned to each other. With a suitable selection of the solvent it is possible to use, for example, polycarbonate or styrene maleic anhydride as the substrate plate material in this mastering process. This in contrast to the photoresist mastering process, since that process uses the solvent MIBK, as a result of which the aforesaid materials become diffuse and exhibit surface cracks, which phenomena do not occur when polyether imide resin is used as the substrate plate material. This latter material allows more freedom in the selection of heat treatment temperatures, also with the ablative process, because the transition temperature of glass is much higher than that of, for example, polycarbonate. The heat treatment may thereby be carried out in two steps of up to 130° C. each for 60 minutes.

Another one of the several mastering processes that may be used is a mastering process whereby bulges are formed on the registration surface of the substrate plate.

Returning to the photoresist mastering process it is noted that the substrate plate I must absorb the laser writing light in the laser beam recorder in which the substrate plate 1 is rotatably and centrally mounted, in order to prevent that false light is generated at the bottom side 3 upon exposure of the upper side 2 to modulated laser writing light. Thus, the polyether imide resin absorbs the blue laser writing light used in the AMS system (see FIG. 2).

During the developing process it is furthermore measured whether the process has progressed far enough, by measuring the intensity of the laser measuring light emitted by the order meter and deflected by the indentations formed in the substrate plate. Thus polyether imide resin transmits the red laser measuring light of the order meter used in the AMS system (see FIG. 2).

With conventional photoresist mastering processes use is made of substrate plates of float glass (soda lime) having diameters of 240 mm and 360 mm and a thickness of 6 mm, which are obtained by grinding, polishing and washing, after which a metal centering boss may be provided.

From the above it will be obvious, that when the substrate plates of float glass are replaced by substrate plates of polyether imide resin, it will be possible to use the same photoresist mastering processes and equipment that are being used for the glass plates.

Figure 2:
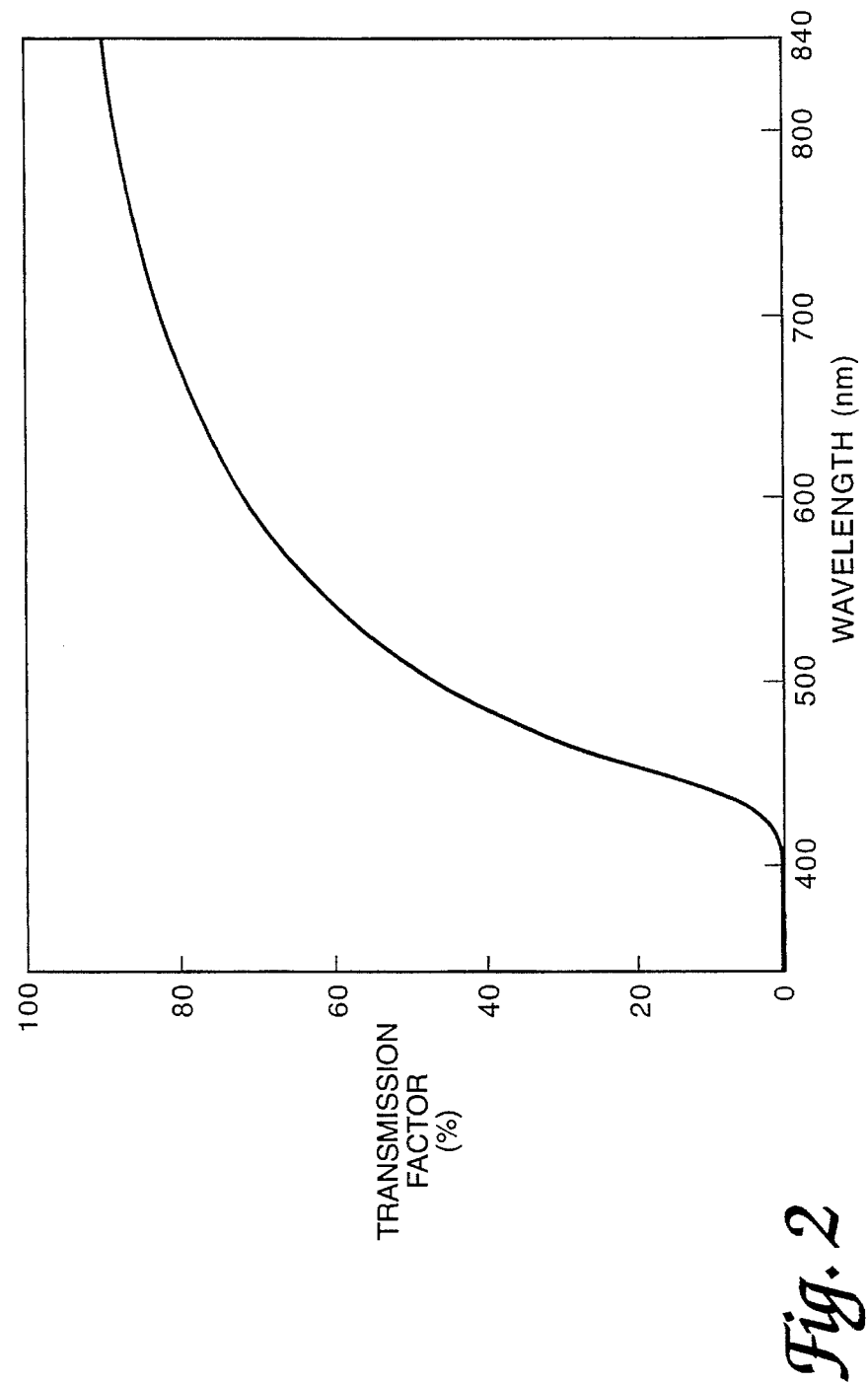
FIG. 2 shows the transmission curve of a polyether imide resin which is now preferred in combination with a photoresist mastering process.

FIG. 2 shows the transmission curve for Ultem 1000 (tradename of GE Plastics), whereby the transmission factor, in per cent, is set out along the ordinate and the wavelength, in nm, is set out along the abscissa.

As said before the plastic material from which the proposed substrate plate I may be made, needs to be moldable. The dimensions and the configuration, as well as the surface roughness of the coating side 2 of the substrate plate 1 can be determined by molding the plastic material, whereby the term configuration refers to whether or not a positive or negative centering is provided; see projection 4. It should be borne in mind that in order to ensure the aforesaid quality the surface roughness of the bottom side 3 of the substrate plate I needs to be low as well. This can also be realized with a selected molding process. Injection molding is a molding process which lends itself well for the present purposes. The mold used in the injection molding process must be highly polished in that case, in order to obtain the desired low surface roughness for the upper side 2 of the substrate plate 1.

It is preferred to remove the static charge from the substrate plate 1 subsequent to the injection molding process, for example by means of an ionized air flow.

We claim:

1. A substrate plate for use as a master disc in the manufacture of a metal mold for the production of disc-shaped optical registration carriers of plastic material, said substrate plate being produced by a photoresist mastering process wherein said substrate plate for said master disc is polyether imide.

2. A substrate plate according to claim 1, wherein said substrate plate absorbs laser writing light.

3. A substrate plate according to claim 2, wherein said substrate plate transmits laser measuring light emitted an order meter.

4. A substrate plate according to claim 3, wherein said substrate plate is of an optical quality.

5. A substrate plate as in claim 1, wherein said substrate plate includes a centering mechanism.

6. A substrate plate as in claim 5 wherein said centering mechanism is integrally formed with said substrate plate.

7. A substrate plate as in claim 6 wherein said centering mechanism comprises an outwardly extending boss.

8. A substrate plate as in claim 1 that is formed by injection molding.

9. A substrate plate as in claim 1, wherein said substrate plate has upper and lower surfaces, said upper surface characterized by having a low surface roughness that has been formed by a polished mold surface.

10. A substrate plate as in claim 8, wherein said molded plate is free of static charges.

11. A substrate plate according to claim 1 wherein said substrate plate transmits laser measuring light emitted by an order meter.

12. A master disc for use in the manufacture of a metal mold that will be used in production of disc-shaped optical registration carriers, said master disc consisting of a substrate plates, having upper and lower sides, and produced by a photoresist mastering process, said substrate plate is polyether imide.

13. A master disc as in claim 12 further including a centering mechanism provided thereon.

14. A master disc as in claim 13 wherein said center mechanism comprises a projection, depending from said lower side, that is integrally molded together with said substrate plate.

15. A substrate plate for use as a master disc in the manufacture of a metal mold for the production of disc-shaped optical registration carriers of plastic material, said substrate plate being produced by an ablative mastering process wherein said substrate plate for said master disc is polyether imide.

16. A master disc for use in the manufacture of a metal mold that will be used in production of disc-shaped optical registration carriers, said master disc consisting of a substrate plate, having upper and lower sides, and produced by a photoresist mastering process, said substrate plate is polyether imide.

* * * * *